United States Patent [19]

Langenfelder et al.

[11] 3,966,488

[45] June 29, 1976

[54] FLOWABLE AQUEOUS PIGMENT FORMULATIONS CONTAINING DIPROPYLENE GLYCOL

[75] Inventors: Hans Langenfelder, Mannheim; Ewald Daubach; Horst Belde, both of Ludwigshafen, all of Germany

[73] Assignee: BASF Aktiengesellschaft, Ludwigshafen (Rhine), Germany

[22] Filed: Jan. 30, 1974

[21] Appl. No.: 438,032

[30] Foreign Application Priority Data
Feb. 1, 1973   Germany............................ 2304978

[52] U.S. Cl.......................... 106/308 Q; 106/288 Q
[51] Int. Cl.²........................................ C04B 31/40
[58] Field of Search................... 106/308 Q, 288 Q

[56] References Cited
UNITED STATES PATENTS 3,156,574   11/1964   Gomm et al................... 106/308 Q 3,705,045   12/1972   Nadolski........................ 106/308 Q

FOREIGN PATENTS OR APPLICATIONS 1,719,396   8/1971   Germany

*Primary Examiner*—Winston A. Douglas
*Assistant Examiner*—John P. Sheehan
*Attorney, Agent, or Firm*—Johnston, Keil, Thompson & Shurtleff

[57] ABSTRACT

Aqueous pigment formulations containing glycol and having good flow, good water retention and good flocculation resistance which contain dipropylene glycol as a flow improver. The formulations are particularly suitable for pigmenting aqueous polymer dispersions and textile pigment printing and dope dyeing.

9 Claims, No Drawings

FLOWABLE AQUEOUS PIGMENT FORMULATIONS CONTAINING DIPROPYLENE GLYCOL

The invention relates to a flowable glycol-containing aqueous pigment formulation which contains dipropylene glycol as a flow improver.

Pigment formulations for aqueous media generally contain an alcohol in addition to the pigment, water, a water-soluble dispersing agent and other auxiliaries. The particular purpose of the alcohol is to serve as a water-retaining agent. Commercial products contain for example about 10 to 30% by weight of ethylene glycol as the alcoholic water-retaining agent.

Formulations having high pigment concentrations, i.e. containing 35% by weight or more of pigment, are often difficult and expensive to prepare because of their high viscosity and moreover processing often offers considerable difficulty. There is therefore a demand for an agent which in addition to serving as a water-retaining agent ensures the flow within a wide range of processing temperatures even in the case of formulations having a high concentration of pigment.

We have now found that aqueous glycol-containing pigment formulations have an improved flow when they contain as the glycol from 5 to 35% by weight (based on the formulation) of dipropylene glycol.

Dipropylene glycol is the compound of the formula:

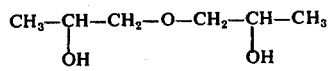

The pigment formulations according to the invention are dispersions which are obtainable by conventional methods and whose content of dipropylene glycol in order that the most favorable flow properties should be obtained without detriment to other characteristics may be from 5 to 35% and preferably from 10 to 30% by weight. In particular a content of from 15 to 25% by weight of dipropylene glycol at a pigment content of from 25 to 70% by weight results in very favorable viscosity of the formulation even at low temperatures. Another advantage of the use of dipropylene glycol is its lack of toxicity established in animal tests.

Examples of pigments which are suitable for formulations according to the invention are copper phthalocyanines, azo pigments, quinacridone pigments, dioxazine pigments, perylene tetracarboxylic acid pigments, thioindigo pigments or pigments from the series of vat dyes. All of these pigments are well known water-insoluble pigments.

Suitable dispersing agents are mainly oxyalkylated compounds and they may be nonionic, cationactive or anionactive. Industrially preferred surfactants are for example reaction products of ethylene oxide and fatty acids, fatty acid amides, phenols and amines, which may be quaternized, or reaction products of propylene oxide or ethylene oxide with amines or alcohols. The formulations may contain additives of conventional type and in conventional amounts, for example mold preventives. The composition is usually from 25 to 70% and advantageously from 35 to 65% by weight of pigment, from 2 to 25% by weight of dispersing agent, from 8 to 20% by weight of water and from 10 to 30% by weight of dipropylene glycol.

The pigment formulations obtained are distinguished by good flow, lack of toxicity, good water retention and good flocculation resistance, particularly at the high temperatures occurring during processing by stirring or kneading. They are mainly used for pigmentation of aqueous polymer dispersions, in textile printing, dope dyeing, mass coloration of paper and pigment padding.

Further details are given in the following Examples. Parts and percentages therein are by weight.

EXAMPLE 1 a. 233 parts of a copper phthalocyanine blue of the α-modification is kneaded for an hour in a kneader with 58 parts of a product obtained by reaction of 1 mole of ethylenediamine with 67 moles of propylene oxide and 74 moles of ethylene oxide, with the addition of 55 parts of a mixture (1:1) of dipropylene glycol and water. A temperature of about 80°C is thus set up. The kneaded material is then diluted with a mixture of equal parts of water and dipropylene glycol until the liquid formulation contains about 44% of pigment. About 0.3% of a mold preventive is also added.

This formulation is readily pourable. The efflux time from a Ford beaker having a 6 mm nozzle is from 40 to 45 seconds ("Paint Flow and Pigment Dispersion" by Temple C. Patton, 1964 edition, pages 61 to 62 is referred to concerning measurement of viscosity with a Ford beaker).

b. Comparative experiment:
Ethylene glycol is used in the method under (a) instead of dipropylene glycol. A highly viscous non-pourable paste is obtained with which it is impossible to determine efflux time from a Ford beaker.

EXAMPLE 2

192 parts of C.I. Pigment Yellow 83 and 31 parts of the dispersing agent specified in Example 1 are kneaded for one hour together with 40 parts of dipropylene glycol. A temperature of about 70°C is thus set up. This kneaded material is then diluted with a mixture of water and dipropylene glycol until the liquid formulation contains about 40% of pigment and 10% of dipropylene glycol.

The formulation shows a Ford efflux time of about 20 seconds.

EXAMPLE 3

300 parts of C.I. Pigment Blue 15, 34 parts of the reaction product of 1 mole of nonylphenol with 20 moles of ethylene oxide and 8 parts of the reaction product of 1 mole of nonylphenol with 4 moles of ethylene oxide as the sodium salt of the sulfuric acid ester are kneaded for one hour together with 102 parts of dipropylene glycol. A temperature of about 100°C is thus set up. The kneaded material is adjusted with water and dipropylene glycol (1:1) to a paste containing 40% of pigment. The formulation flows readily.

EXAMPLE 4

640 parts of C.I. Pigment Green 7 and 128 parts of the reaction product of 1 mole of stearyl alcohol and 23 moles of ethylene oxide are kneaded for one hour together with 138 parts of dipropylene glycol. A temperature of about 110°C is set up. The kneaded material is then adjusted as described in Example 1 to a formulation containing about 52% of pigment which pours well.

We claim:

1. An aqueous pigment composition having improved flow, said composition consisting essentially of a. water,
b. a water-insoluble pigment,
c. a water-soluble dispersing agent and
d. from 5 to 35% by weight of dipropylene glycol based on the total weight of the composition.

2. A pigment composition as claimed in claim 1 in which the content of dipropylene glycol is from 15 to 25% by weight based on the composition.

3. A pigment composition as claimed in claim 1 which contains a copper phthalocyanine, azo pigment, quinacridone pigment, dioxazine pigment, perylene tetracarboxylic acid pigment, thioindigo pigment or vat dye as the pigment.

4. A pigment composition as claimed in claim 1 in which the dispersing agent is selected from the group consisting of nonionic, cationic and anionic oxyethylated and oxypropylated compounds.

5. A pigment composition as claimed in claim 4 in which the dispersing agent is the ethylene oxide and propylene oxide adduct of ethylene diamine.

6. A pigment composition as claimd in claim 4 in which the dispersing agent is the ethylene oxide adduct of nonylphenol.

7. A pigment composition as claimed in claim 4 in which the dispersing agent is the ethylene oxide adduct of stearyl alcohol.

8. A pigment composition as claimed in claim 1 in which there is from 8 to 20% by weight of water, 25 to 70% by weight of pigment, 2 to 25% by weight of dispersing agent and 10 to 30% by weight of dipropylene glycol, based on the total weight of the composition.

9. A pigment composition as claimed in claim 8 in which the content of pigment is about 35 to 65% by weight.

* * * * *